(No Model.) 4 Sheets—Sheet 2.
E. THOMSON.
DYNAMO ELECTRIC MACHINE.

No. 468,121. Patented Feb. 2, 1892.

WITNESSES
A. F. Macdonald
John W. Gibboney

INVENTOR
Elihu Thomson
Bentley & Knight
Attys.

(No Model.) 4 Sheets—Sheet 4.

E. THOMSON.
DYNAMO ELECTRIC MACHINE.

No. 468,121. Patented Feb. 2, 1892.

WITNESSES
Alec F. Macdonald.
John L. Gibboney.

INVENTOR-
Elihu Thomson
by Burley Knight
Atty.

UNITED STATES PATENT OFFICE.

ELIHU THOMSON, OF SWAMPSCOTT, MASSACHUSETTS.

DYNAMO-ELECTRIC MACHINE.

SPECIFICATION forming part of Letters Patent No. 468,121, dated February 2, 1892.

Application filed October 16, 1890. Serial No. 368,290. (No model.)

*To all whom it may concern:*

Be it known that I, ELIHU THOMSON, a citizen of the United States, residing at Swampscott, county of Essex, and State of Massachusetts, have invented a certain new and useful Improvement in Dynamo-Electric Machines, of which the following is a specification.

My present invention relates to improvements in dynamo-electric machines, whether generators or motors; and the particular type of machine to which they are herein shown applied is that designed for the production of alternating currents, for which Letters Patent No. 432,655 were granted to me July 22, 1890, and comprising, in general terms, a revolving multipolar consequent pole, surrounding which is a stationary magnet-frame carrying the armature-coils in which the currents are induced. The improvements for which protection is now sought cover certain mechanical features of construction, all as hereinafter pointed out in the claims, which have been found to add to the readiness with which the machine can be put together, its capability for being readily repaired, and its efficiency as a converter of energy. They comprise, in general, the building up of the stationary magnet-frame in sections in such a way as to allow the ready removal of the armature-coils and also certain parts of the revolving consequent pole, whereby ease of construction is gained and heating of the machine by the production of Foucault currents is avoided. Certain improvements in other parts of the machine also are claimed, to which full reference will be found hereinafter.

Figure 1:
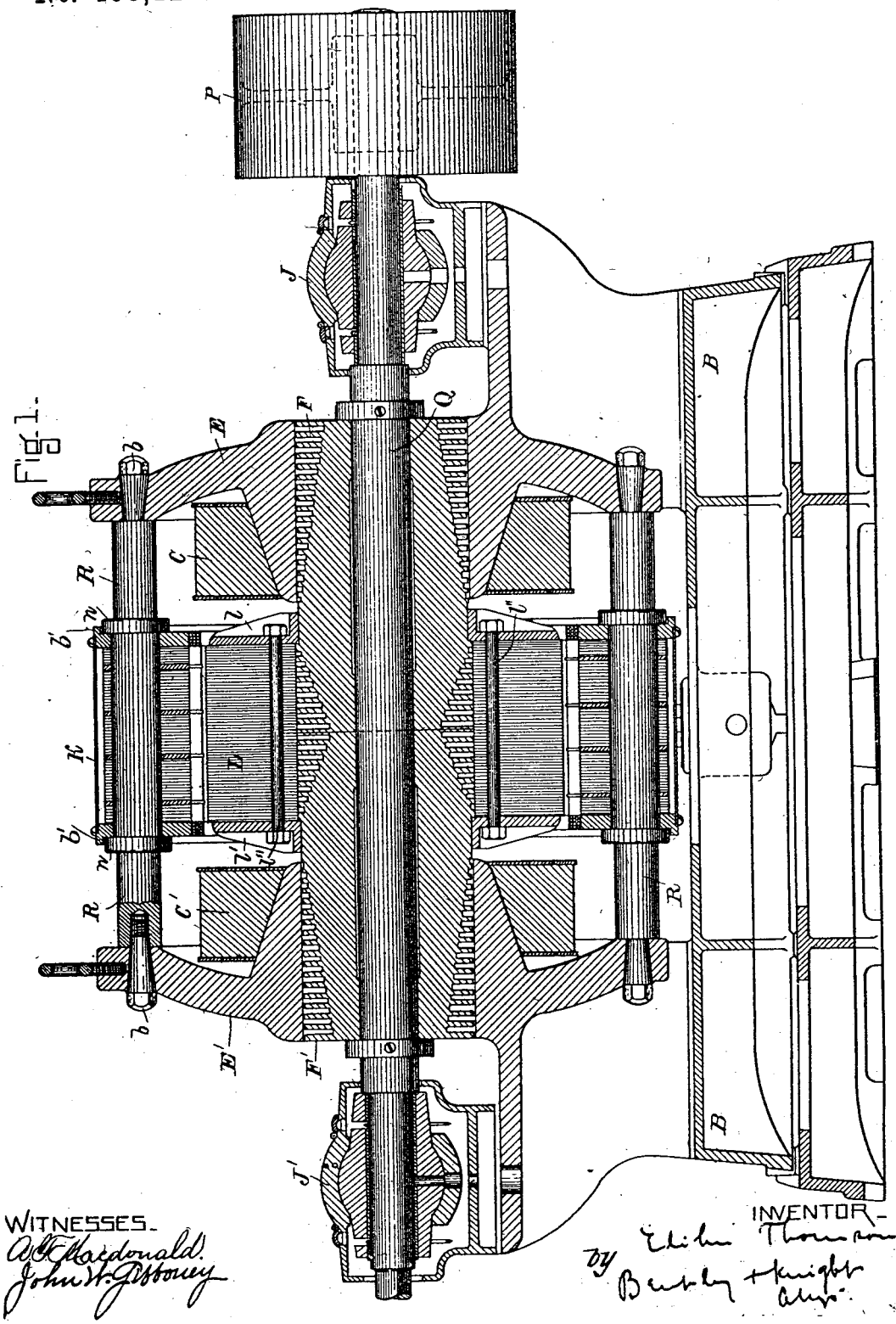
Figure 2:
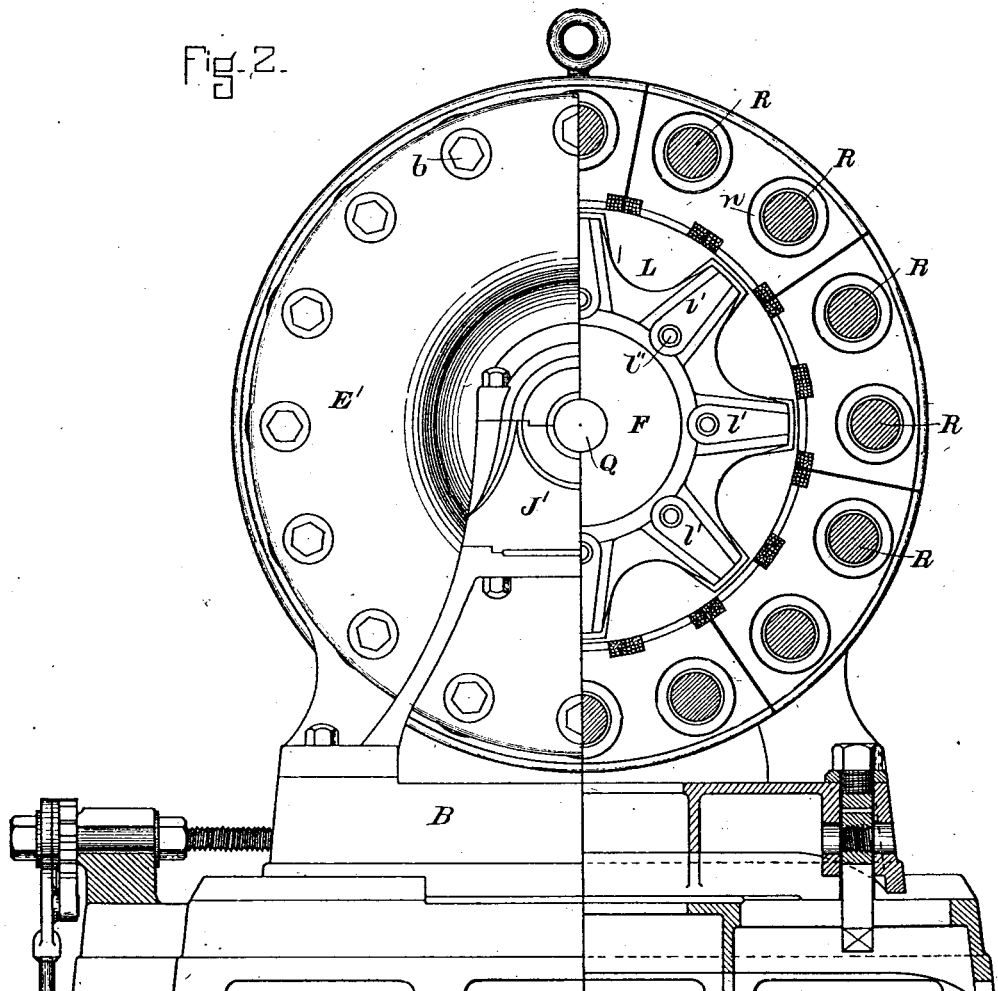
Figure 3:
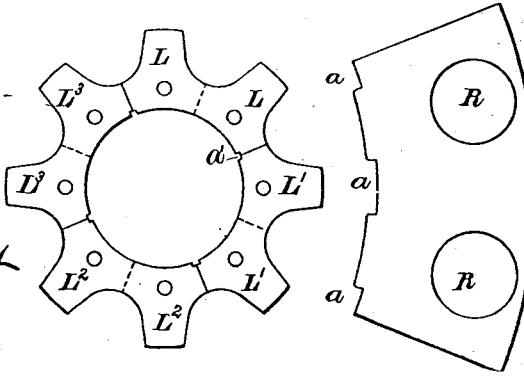
Figure 4:
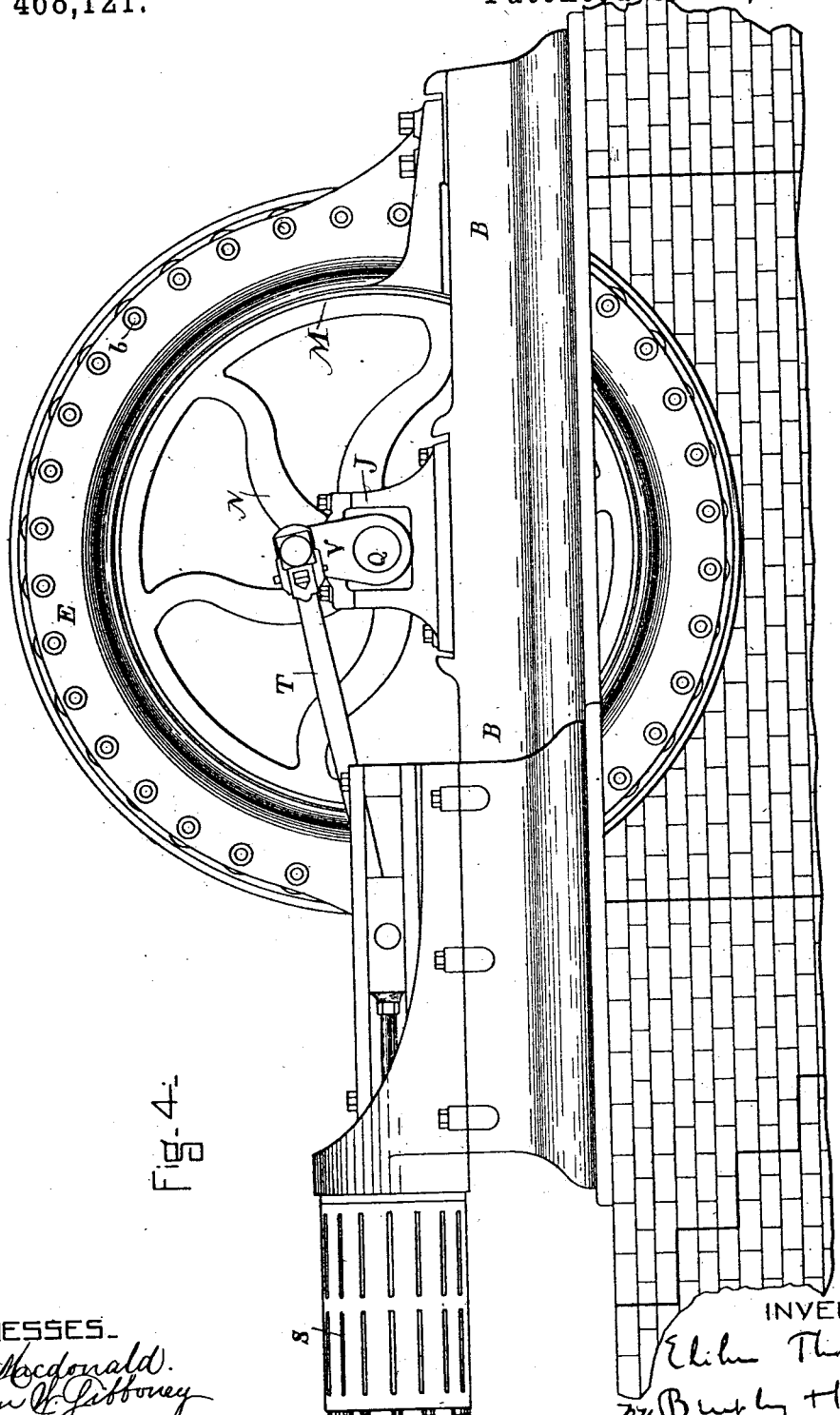
Figure 5:
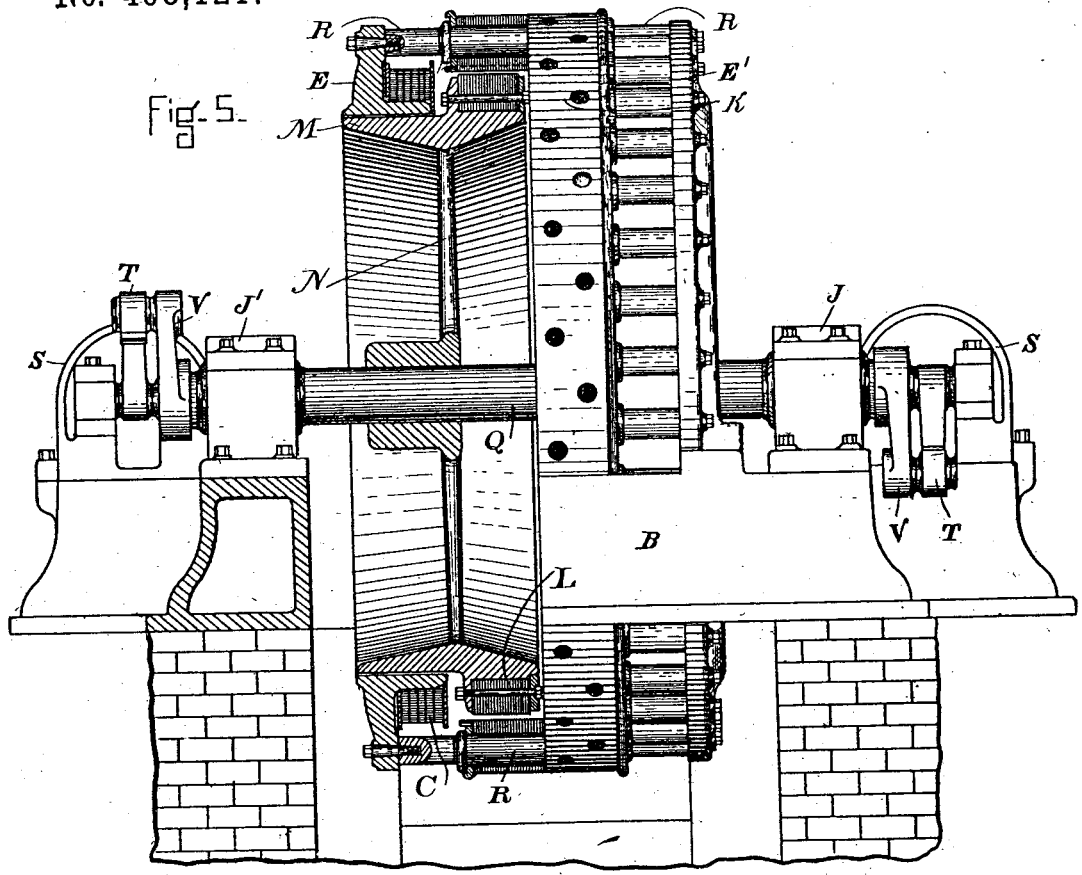
Figure 6:
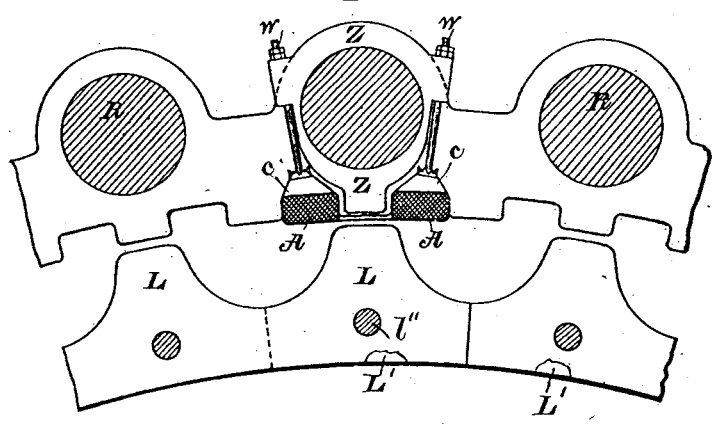

In the accompanying drawings, Figure 1 is a vertical section of my improved machine. Fig. 2 shows the machine half in section and half in full, as seen from one end. Fig. 3 illustrates certain of the parts from which the consequent pole and magnet-frame are built up. Fig. 4 is a side view of a driving-engine and an electric generator mounted upon a common bed-plate. Fig. 5 is an end view, half in section, of a modified form of the machine; and Fig. 6 is a detail sectional view designed to illustrate the means for holding the generating-coils in place.

As shown in Fig. 1, the frame-work of the machine consists of two upright end plates E E', which are fixed upon the adjustable bed-plate B and are provided with lateral extensions upon which rest the journal-boxes J J'. These boxes are of a self-adjusting and self-oiling variety well known in the art, and in them turns the revolving shaft Q, driven by the pulley P. The exciting-coils C C' are arranged in a fixed position around bosses projecting inwardly from the respective end plates, as in my former patent, and the moving portion of the machine revolves within these bosses, so as to constitute a part of the magnetic circuit induced by the coils.

As shown in Fig. 1, the "moving-pole support," as I call it herein, consists of a solid core F', centered upon the shaft by collars, and made either in one piece or of two or more sections placed end to end, as may be desired. Upon the core is the consequent pole L, which has a number of polar extensions of like polarity. This pole is built up of successive blanks or laminæ clamped together between end plates $l$ $l'$ by transverse bolts $l''$, and the whole is keyed to the core, as at $a'$, Fig. 3, or otherwise fixed rigidly thereto. The laminæ may consist of rings of sheet-iron placed side by side; but preferably they will be segment-shaped and the pole will be built up, as in Fig. 3, where four laminæ L L L' L', &c., are shown, each long enough to comprise two, at least, of the polar extensions. They are perforated and strung upon the transverse bolts $l''$, but in such a way that the laminæ making up adjacent rings interlock with or overlap one another, as indicated in the drawings, where the dotted lines represent the abutting ends of a second ring of laminæ, which are hidden behind the first. As thus arranged one of the bolts will pass through each end of the laminæ and the whole be firmly bound together. At the point where the magnetic circuit enters the core from the end plates and passes out to the consequent pole the core is slitted or grooved, as at F. The depth of these grooves gradually diminishes from the outer to the inner ends of the bosses, around which are the exciting-coils, and is then gradually increased again from the ends to the center of that portion of the core over which the consequent pole is placed. They tend to prevent the production of Foucault currents and consequent heating of the machine, while at the same time the arrangement is such as to reduce as little as possible the amount of metal in the magnetic circuit. If desired, the grooves might be cut in the bosses instead of the core; but the latter, as shown, is preferred.

The armature-generating coils are carried upon a stationary exterior magnet-frame, (shown in the form of a ring,) the construction of which will now be described. It consists of a number of segmental sections, which are fitted together end to end, forming a butt-joint with one another; but the laminæ do not interlock, as is the case in the consequent pole. Each section comprises a number of thin blanks perforated by one or more holes and recessed on its inner edges, as at $a$, to form polar projections, which will be located opposite to the revolving poles. Transverse rods R pass through the perforations in the laminated segments and have projecting ends, which are secured to the frame-work of the machine by tapering bolts $b\ b$. The number of these rods may be varied, and also the means for securing them in position; but the construction shown is a desirable one, because it furnishes ready means for removing the sections individually from the ring, all that is necessary being to take out the bolts $b$ and slide the rods R out from between the end plates. In order to center the segments accurately and to bind them rigidly, clamping-plates $b'\ b'$ are provided, and stop-nuts $n\ n$ upon each transverse rod screw up against the plates. Around the entire ring is placed a metal casing K, which may be perforated as shown in Fig. 5 for the circulation of currents of air for ventilating the machine. The armature-coils A, in which the alternating currents are generated and which will be coupled up with the work-circuit in any desired one of a variety of ways, are located in the recesses $a$ upon the inner circumference of the magnet-frame, where they will be crossed by the consequent pole during its revolution. They are held in place by straps $c\ c$, which pass around them, and are adjustably secured to the magnet-frame. This is shown in Fig. 6, where Z are spacing-plates of zinc or sheet-iron, which are placed at intervals around the entire ring, so as to form ventilating-openings parallel with the laminæ. The straps $c$ are attached to bolts W, which are fastened to the spacing-plates, and screw-nuts allow for adjusting the straps, so as to hold the coils always firmly in position. Whenever, therefore, it becomes necessary to renew one of these coils the corresponding section of the ring will be removed in the manner described, and the coil is taken out with it without the necessity of having to take to pieces other portions of the machine.

In Fig. 4 an arrangement is shown which will be found of service principally in installing generators of large capacity. Here a driving engine is shown at S, which gives motion to the revolving portion of the generator by means of the connecting-rod T and crank V. The engine is mounted upon a bed-plate B, and upon this same bed-plate is also situated the frame-plates E E', which carry the fixed parts of the generator, as before described, and the journal-boxes J for the driven shaft.

The consequent-pole support, instead of being a solid core, as in Fig. 1, is of the character more clearly shown in Fig. 5. It consists of a broad heavy rim M, upon which the laminated pole is carried, and spokes N connect the rim with the hubs, which are made fast to the shaft. In this way ventilating-openings are provided in the pole-support and allow a circulation of air from one end to the other of the machine and also through the perforations in the casing K, which has a beneficial effect in ventilating the coils of the armature and field. This ventilating action may in certain cases be still further increased with advantage by dividing the revolving pole, the magnet-frame, or both, into two or more portions parallel to the plane of revolution, as is likewise shown in Fig. 5, and leaving a ventilating-space between the adjacent portions. The pole-support in these last forms of the machines is not shown grooved, as in Fig. 1; but this will be understood as present without illustration.

In describing the structure of my improved machine as above I have not deemed it necessary to explain its method of operation, as this is set forth in my former patent, No. 432,655, and will be readily understood by those skilled in the art.

I am aware that many of my present improvements will prove of service in machines other than the particular type herein described, and also that they may be embodied in various modified constructions which I have not attempted to set forth in detail, for the claims in defining the scope of my invention are intended to include all such departures from the structure represented.

What I claim as new, and desire to secure by Letters Patent, is—

1. The combination, in a dynamo-electric generator or motor, of a revoluble magnetic core having a number of polar extensions of like polarity and the stationary exciting coil or coils surrounding the core, with an exterior magnet structure made in sections fitted together end to end and presenting poles of opposite polarity to the revolving magnet-poles, generator-coils surrounding said fixed poles and attached to the different sections, respectively, and means for removing and replacing the sections with their coils individually.

2. In a dynamo-electric generator or motor, the combination of a magnetic core having polar projections forming a divided multipolar consequent pole revoluble about an axis, and the exciting-coils surrounding the core to one side of the polar projections, but inside the frame of the machine, with the exterior magnet-frame having poles and coils in front of which the consequent pole revolves and made in sections removable individually, and one or more rods passing through each section and having ends projecting to the frame of the machine to which they are secured, as set forth.

3. The combination of the revoluble core having polar extensions of like polarity and the stationary exciting-coils with the exterior fixed magnet-frame made in sections fitted together end to end, with supporting-rods passing through said sections and attached to the frame-work of the machine, whereby they can be readily removed, and means for attaching the generator-coils to the fixed magnet-sections and replacing them readily, as described.

4. In a dynamo-electric generator or motor, the combination of a stationary laminated magnet-frame having the coils disposed in recesses therein with plates arranged to form ventilating-openings parallel with and between the laminæ, as set forth.

5. The combination, in a dynamo-electric generator or motor, of the end plates, as E E', with the stationary sectional magnet-frame, a transverse rod or rods passing through and supporting each section of said frame, and the tapering bolts securing the rods to the end plates, as described.

6. The combination, in a dynamo-electric generator or motor, of the stationary magnet-frame built up of segmental laminated sections fitted together end to end with the two transverse rods passing through each section and the tapering bolts securing the rods to the frame-work of the machine, whereby each section is individually removable, as described.

7. The combination, in a dynamo-electric generator or motor, of the stationary magnet-frame having inwardly-projecting polar extensions between which the generating-coils are disposed with straps surrounding the coils, and adjustable means for securing the said straps to the frame.

8. The combination, in a dynamo-electric generator or motor, of the stationary laminated magnet-frame having the generating-coils disposed in recesses therein with spacing-plates arranged to form ventilating-openings parallel with and between the laminæ, straps connected with the coils, and adjustable bolts securing the straps to the spacing-plates and thereby holding the coils in place.

9. The combination, in a dynamo-electric generator or motor, of the stationary magnet-frame carrying the generating-coils with the revolving magnet structure comprising the core, segment-shaped laminæ fitted directly around the outside of and secured to the core, and transverse bolts binding the laminæ together, as described.

10. The combination, in a dynamo-electric generator or motor, of a stationary magnet-frame carrying the armature-generating coils with the revolving consequent pole composed of laminated sections fitted directly around a central magnetic core and bound together by transverse bolts, the laminæ of adjacent sections being arranged so as to interlock or overlap, substantially as described.

11. In a dynamo-electric generator or motor, the combination of the stationary magnet-frame carrying the generating-coils with the revolving consequent pole terminating in a series of like polar extensions and composed of laminated interlocking sections arranged around a central core, each lamina having at least two of the polar extensions, and transverse bolts binding the laminæ together, as described.

12. The combination, in a dynamo-electric generator or motor, of the exciting-coils with the revolving magnet-core forming part of the magnetic circuit and grooved or slitted in a direction transverse to the direction of the lines of force through said core.

13. The combination of the stationary exciting-coils with the magnetic pole-support and consequent pole revolving within the magnetic circuit, the said pole-support being provided with graduated grooves or slits, as described, at the point where the magnetic circuit enters or leaves the same.

14. The combination, in a dynamo-electric generator or motor, of the stationary magnet-frame carrying the generating-coils with the revoluble magnetic consequent pole and pole-support having a ventilating opening or openings in its ends, for the purpose set forth.

15. The combination of the stationary magnet-frame carrying the generator-coils with the pole-support consisting of a rim, the laminated consequent pole fitted directly around and secured to the rim, and spokes connecting the rim with a hub on the driving-shaft, for the purpose set forth.

16. The combination, in a dynamo-electric generator or motor, of the stationary magnet-frame carrying the generating-coils with the revoluble consequent pole divided parallel to the plane of revolution into two or more portions separated from one another by an intervening ventilating-space.

In testimony whereof I have hereunto set my hand this 14th day of October, 1890.

ELIHU THOMSON.

Witnesses:
JOHN W. GIBBONEY,
JOHN T. BRODERICK.